Nov. 18, 1924.                                                    1,516,058
A. M. PORTER
WATER SYSTEM FOR INTERNAL COMBUSTION ENGINES
Filed Sept. 27, 1923
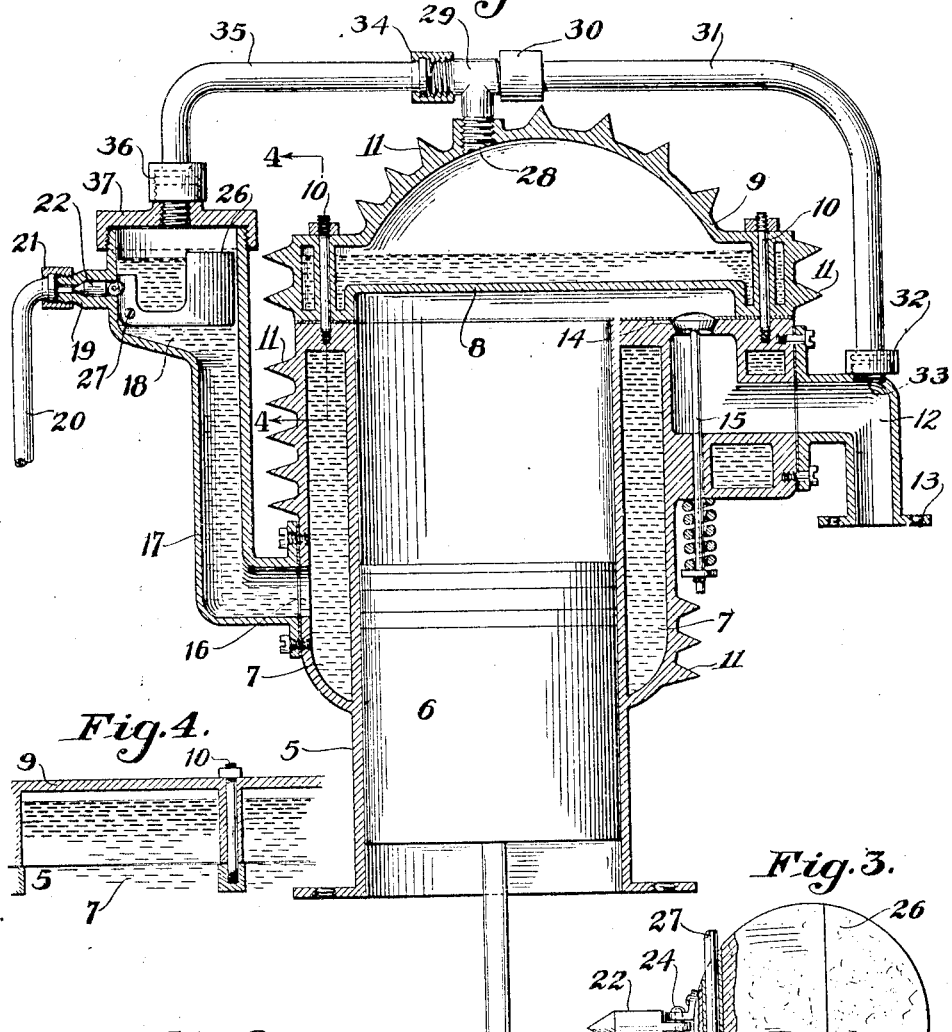
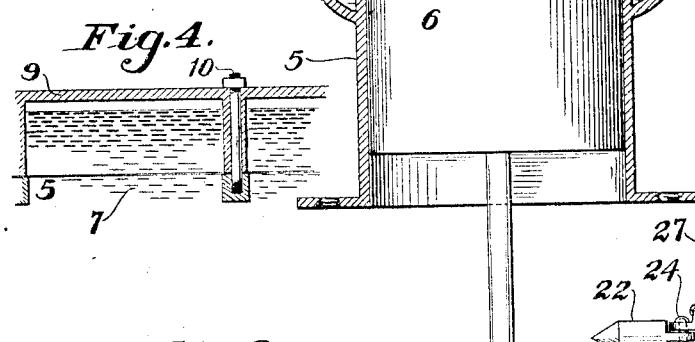
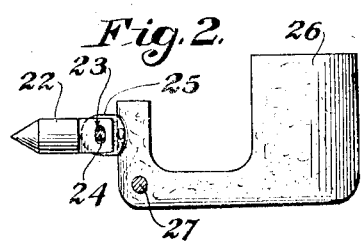
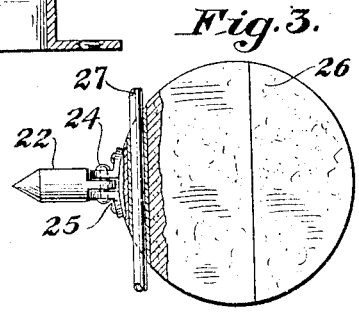
Albert M. Porter
INVENTOR
WITNESSES
Louis Goodman
E. N. Lovewell
BY
ATTORNEY Patented Nov. 18, 1924.

1,516,058

UNITED STATES PATENT OFFICE.

ALBERT MOORE PORTER, OF LINN COUNTY, KANSAS.

WATER SYSTEM FOR INTERNAL-COMBUSTION ENGINES.

Application filed September 27, 1923. Serial No. 665,233.

*To all whom it may concern:*

Be it known that I, ALBERT M. PORTER, a citizen of the United States, residing in the county of Linn and State of Kansas, have invented a new and useful Water System for Internal-Combustion Engines, of which the following is a specification.

This invention relates to a water system for internal combustion engines, arranged with special reference to its efficiency as a cooling medium, and also with a view to supplying a certain amount of moisture to the fuel mixture.

One of the principal objects of the invention is to provide improved means for cooling the water in the jacket by evaporation, thereby making it feasible to discard the usual radiator and fan, at the same time conserving energy contained in the excess heat of the water by transforming it into latent heat, of vaporization and utilizing it as a part of the fuel charge, instead of allowing it to be dissipated into the atmosphere.

A more specific object of the invention is the maintenance of a partial vacuum within the water jacket by the suction induced by the operation of the engine, thereby lowering the boiling point of the water and effectually preventing the temperature of the water from rising above a predetermined point, and preventing the engine from becoming over-heated under any conditions.

A further object of the invention is to provide a float controlled feed for supplying water to the jacket, and maintaining the water in the jacket at a constant level. A jacket is provided for both the walls and the head of the cylinder, and the outer face of both may, if desired, be provided with ribs to form a more efficient radiating surface.

The preferred form of the invention is illustrated in the accompanying drawing, in which—

Figure 1 is a vertical transverse section through the cylinder of an engine embodying the invention.

Figure 2 is a side elevation of the float and the needle valve controlled thereby.

Figure 3 is a plan view of the same.

Figure 4 is a fragmentary sectional view taken on the line 4—4 of Figure 1.

The engine, in connection with which the invention is illustrated comprises one or more cylinders 5 in each of which operates a piston 6. The walls of each cylinder contain the usual water jacket 7, and the head 8 of the cylinder also includes a dome-shaped water jacket 9, which is in communication with the water jacket of the cylinder and forms part of the cooling system. The head 8 is removably secured to the cylinder in the usual manner by bolts 10 or the like. The outer surface of the cylinder walls and of the head 8 may, if desired, be formed with ribs 11, for the purpose of providing greater radiating surface.

Secured to the side of the cylinder is the usual fuel intake passageway or manifold 12, which is provided at its outer end with a flange 13, or other means for securing a carbureter thereto. The passageway 12 communicates with the interior of the cylinder 5 through an intake port 14, which is controlled in the usual manner by a valve 15.

The water jacket 7 is provided near its bottom with an opening 16, to which is connected by suitable means a water passageway 17, having a float chamber 18 at its upper end extending somewhat above the explosion chamber of the cylinder 5. The float chamber 18 is provided with a laterally extending nipple 19 which is connected with a water supply pipe 20, by a suitable union 21. The water, which is admitted to the water system through the nipple 19, is controlled by a needle valve 22, having at its inner end a slot 23, through which extends a pin 24 secured in an ear 25, which extends laterally from a float 26 disposed within the chamber 18. (Figs. 2 and 3.) The float is pivotally mounted on a pin 27 extending across the chamber 18, and acts in the manner of a bell crank when the level of the water is lowered to withdraw the needle valve from its seat, and admit water from the supply pipe 20.

The water jacket 9 of the head 8 is provided near its top with an opening 28, into which is threaded a T 29, one branch of which is connected by a union 30 to a pipe 31, the other end of the pipe being connected by a union 32 with a nipple 33, which affords communication with the fuel into the passageway 12 between the carbureter and the intake port of the cylinder. The other branch of the T 29 is connected by a suitable union 34 with a pipe 35, which is connected at its other end by a suitable union 36 to a nipple formed on the cap 27 of the float chamber 18.

The float maintains the water at a certain level in the float chamber and also in the dome-shaped jacket, the space above the water level in said jacket being normally a dead air space.

As soon as the engine is in operation the suction created by the intake stroke of the piston 6, which sucks the fuel in through the passageway 12, also by reason of the suction through the pipe 31 creates a partial vacuum in the water jacket 9, and in the float chamber 18 above the level of the water therein. This partial vacuum causes the water within the jacket to boil at a lower temperature, so that as soon as the heat of the engine reaches a certain point below the natural boiling point of the water, the latter begins to boil and the excess of heat is transformed into latent heat of vaporization. The vapor or steam thus created is drawn through the pipe 31, and mingles in the passageway 12 with the fuel being drawn into the cylinder, and in the case of the low-grade fuel now generally used, this increases the efficiency of the engine by affording a more complete combustion, as will be understood by those skilled in the art. The energy consumed by the heat of the water is also utilized to increase the power of the engine. Inasmuch as the operation of the engine thus gradually consumes the water within the water system, the float controlled water inlet pipe 20 has been provided for supplying additional water, and by means of the float the water within the system is maintained at a constant level. The tank, from which the water is supplied through the pipe 20, need not be above the float chamber 18, but may be drawn in by suction from a lower level in the same manner as gasoline is supplied to the carbureter by means of the usual vacuum feed.

Ordinarily there is no chance of the engine becoming over-heated, since the latent heat consumed by the vaporization of the water will generally maintain the temperature nearly constant. The usual fan and radiator which is used for cooling the water may therefore be omitted, and the heat, instead of being dissipated by the fan into the atmosphere, is converted into a form which may be utilized in producing power. In some cases, however, it may be found desirable to facilitate the cooling of the engine by the provision of the ribs 11, which add to the radiating surface.

While I have shown and described the specific construction of one form in which the invention may be embodied, it is to be understood that this is merely illustrative, and that various modifications may be made in the relative arrangement of the parts and the minor details thereof, without sacrificing any of the salient features of the invention as defined in the claims.

What is claimed is:

1. In an internal combustion engine, the combination of a cylinder having an intake passageway and a water jacket, means for maintaining water at a constant level below the top of said jacket, said means constituting the only inlet to the jacket, means for attaching a carburetor to the outer end of the intake passageway of the cylinder, and means affording direct and constant free communication between said intake passageway and the interior of the water jacket above the water level in the jacket, said last mentioned means constituting the only outlet for the water jacket, whereby suction developed by the operation of the engine draws water vapor into the intake passageway and creates and maintains a partial vacuum in said water jacket.

2. In an internal combustion engine, the combination of a cylinder having a head with a dome-shaped water jacket, means for supplying said jacket with water up to a certain level which is below the upper wall of the jacket so as to leave a closed space between the level of the water and the top wall of the jacket, said means constituting the only inlet to the jacket, and means for connecting said space with the intake of the engine and constituting the only outlet from the water jacket, thereby maintaining a partial vacuum within said jacket during the operation of the engine.

3. In an internal combustion engine, the combination of a cylinder, a head therefor, a water jacket for the cylinder and head, a fuel intake passageway leading to the cylinder and having means at the outer end for attaching a carbureter thereto, a float chamber in communication with the lower portion of the jacket, a water supply pipe connected with the float chamber, a valve for said pipe, a float within the chamber controlling the valve and maintaining water at a constant level within the jacket, and a branched passageway affording direct communication between the intermediate portion of the fuel intake passageway and the float chamber and jacket respectively above the level of the water in said chamber and jacket as determined by said float.

4. In an internal combustion engine, the combination of a cylinder having a head with a dome-shaped water jacket provided with external ribs, a float chamber, a passageway constituting the only inlet to said water jacket, a float controlled valve for limiting the admission of water to a certain level which is below the upper wall of the jacket so as to leave a closed space between the level of the water and the top wall of the jacket, and means for connecting said space with the intake of the engine and constituting the only outlet from the water jacket, thereby maintaining a partial vacuum within said jacket during the operation of the engine.

5. In an internal combustion engine, the combination of a cylinder having a head provided with a water jacket, and a jacket for the cylinder separate from the head jacket but having communication therewith, means for supplying water to both of said water jackets so as to maintain the cylinder jacket completely full and the head jacket partially full leaving an air space above the top of the water level in the head jacket, and a pipe leading from the top of the head jacket to the intake of the engine, said head jacket being otherwise imperforate so that a partial vacuum is maintained therein during the operation of the engine.

6. In an internal combustion engine, the combination of a cylinder, a head therefor, a dome-shaped water jacket for the head and a separate water jacket for the cylinder, said water jackets being in communication, a float chamber with a passageway leading from its bottom to the cylinder jacket, a float within the chamber, a water supply pipe for the float chamber, a valve for said pipe controlled by the float so as to maintain the water at a constant level within the dome-shaped water jacket and also within the float chamber, said level being above the highest point of the cylinder jacket, and a branched pipe directly connecting the upper part of the float chamber and the upper part of the dome-shaped water jacket with the intake of the engine, whereby a partial vacuum is maintained in said dome-shaped water jacket and said float chamber during the operation of the engine.

In testimony that I claim the foregoing as my own, I have hereto affixed my signature.

ALBERT MOORE PORTER.